United States Patent [19]

Millar et al.

[11] Patent Number: 4,607,157

[45] Date of Patent: Aug. 19, 1986

[54] AUTOMATIC FOCUS OFFSET CORRECTION SYSTEM

[75] Inventors: Ronald A. Millar, Sunnyvale; Charles B. Abate, San Jose, both of Calif.

[73] Assignee: Xerox Corporation, Stamford, Conn.

[21] Appl. No.: 578,399

[22] Filed: Feb. 9, 1984

[51] Int. Cl.[4] .................................................. G01J 1/20
[52] U.S. Cl. ...................................... 250/201; 369/45
[58] Field of Search ................ 250/201 AF, 201 DF, 250/204; 369/44, 45, 46; 318/577

[56] References Cited

U.S. PATENT DOCUMENTS

| | | | |
|---|---|---|---|
| 3,596,064 | 7/1971 | Markevitch | 250/202 |
| 3,673,412 | 6/1972 | Olson | 250/201 |
| 4,032,776 | 6/1977 | van Rosmalen | 250/201 |
| 4,097,730 | 6/1978 | Korpel | 250/204 |

Primary Examiner—David C. Nelms
Assistant Examiner—James Gatto
Attorney, Agent, or Firm—Leonard Zalman

[57] ABSTRACT

A small amplitude, low frequency, signal is added to the focus servo signal controlling the position of the objective lens of an optical disc storage system after focus acquisition has been achieved, so as to produce a slight defocusing effect of the light spot on the disc. The resulting variations in the read back signal is utilized by a synchronous detection circuit scheme to extract magnitude and polarity information of the focus offset present. That information is fed back to the focus servo signal to null out the focus offset, thereby assuring continual accurate focusing of the laser beam even under conditions of changes in the mechanical alignment of the optics of the storage system and/or the d.c. stability of the electronics of the storage system.

2 Claims, 6 Drawing Figures

AUTOMATIC FOCUS OFFSET CORRECTION SYSTEM

BACKGROUND OF THE INVENTION

Digital optical discs are now being seriously considered as alternatives to magnetic tapes and disc memories. It has been found that optical discs offer substantially greater data storage capacity than commercially available magnetic tape or disc memories of similar size.

For optical disc recording or play back, accurate focusing of the laser beam on the storage medium's surface is essential. Once focus is obtained, it is required that the focus point be maintained in spite of vertical run-out variations of the disc surface. This is achieved by means of a focus-following type servo mechanism controlling the vertical positioning of the objective lens. However, the servo assumes that the spatial position of the true focus point is coincident with the zero of the differential error curve of the focus sensors. This condition for coincidence can be upset by changes in the mechanical alignment of the optics and/or the d.c. stability of the electronic circuitry. The result is a focus offset which, if not corrected, produces a loss of spot resolution and accuracy thus degrading the performance of the whole system. A means of correcting for this drift problem is required and a solution to the problem is the subject of this invention.

SUMMARY OF THE INVENTION

A small amplitude, low frequency, signal is added to the focus servo signal controlling the position of the objective lens of an optical disc storage system after focus acquisition has been achieved, so as to produce a slight defocusing effect of the light spot on the disc. The resulting variations in the read back signal is utilized by a synchronous detection circuit scheme to extract magnitude and polarity information of the focus offset present. That information is fed back to the focus servo signal to null out the focus offset, thereby assuring continual accurate focusing of the laser beam even under conditions of changes in the mechanical alignment of the optics of the storage system and/or the d.c. stability of the electronics of the storage system.

DETAILED DESCRIPTION OF THE ILLUSTRATED EMBODIMENT OF THE INVENTION

Figure 1:
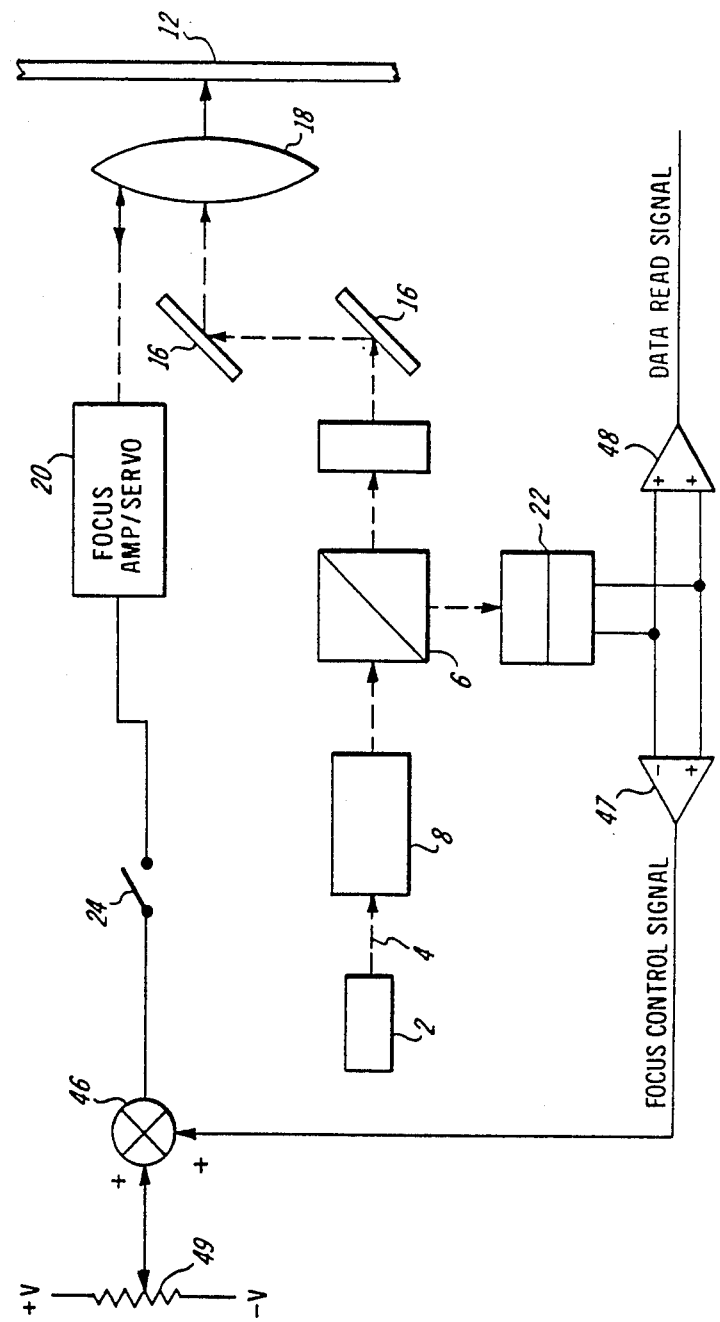
FIG. 1 illustrates schematically a prior art optical reader.

Turning now to the drawings, and at this point especially to FIG. 1, there is shown an optical recorder or disc drive having a read head for optically retrieving digital data from a threshold sensitive recording medium 12. Typically, the recording medium 12 is a removable disk which is rotated (by means not shown) during operation at an essentially constant angular velocity relative to the read head.

To retrieve previously recorded data from the disc 12 and to provide focus control while data is being recorded or retrieved, the read head includes a relatively low power laser 2 for supplying a coherent light beam 4 which is transmitted onto a polarizing beam splitter 6 by a correction lens arrangement 8. Beam 4 is incident next on a quarter($\frac{1}{4}$) wavelength plate 14 which, in turn, transmits the beam to the medium 12 via turning mirrors 16 and an objective or focusing lens 18. In keeping with accepted practice, the objective lens 18 is moved back and forth relative to the disc by a focus amplifier/servo 20 so that the beam 4 is focused at the disc surface.

The reflected read/focus control beam is reflected back through the objective lens 18 and the quarter wavelength plate 14 to the beam spliter 6 which directs the beams to a detector array 22. The quarter wavelength plate and the polarizing beam splitter are relied upon to prevent any significant optical feedback to the laser 2 so that the reflected read/focus correction beam is efficiently transmittd to the detector array 22. The output of the detector array is utilized during times that the beam 4 is traversing pre-formatted data portions or prerecorded portions of the disc to provide the focus control signal utilized by the focus servo 20 to move the objective lens 18 back and forth relative to disc 12. The detector output is also used to produce the data read signal at the output of amplifier 48.

The focus servo may be comprised, for example, of a solenoid arrangement (not shown) with a coil which drives an actuator rod coupled to the objective lens 18. The feedback loop of the focus servo includes a switch 24 which is initially open; that is, the feedback loop initially operates in an open loop manner, and during that time, the focus servo is driven by a sawtooth waveform (not shown) which causes the objective lens 18 to move back and forth relative to disc 12 so that the beam 4 goes in and out of focus on disc 12. When the beam 4 is nearly in focus, that is, when it is near its true focus point, the sawtooth waveform is no longer applied to the focus servo and the switch 24 is simultaneously closed, thereby closing the feedback loop and ending the focus acquisition mode of operation of the focus servo.

The system of FIG. 1 is of conventional design, wherein the focus servo assumes that the spatial position of the true focus point is coincident with the zero of the differential error curve of the focus sensors at 47. However, that condition of coincidence can be upset by changes or drifting in the mechanical alignment of the optics and/or the d.c. stability of the electronic circuitry. The result is a focus offset which will produce loss of spot resolution and accuracy, thus degrading the performance of the system. Correction could be obtained by manual adjustment using potentiometer 49 and summing junction 46, but automatic, dynamic adjustment is preferred.

Figure 2A:
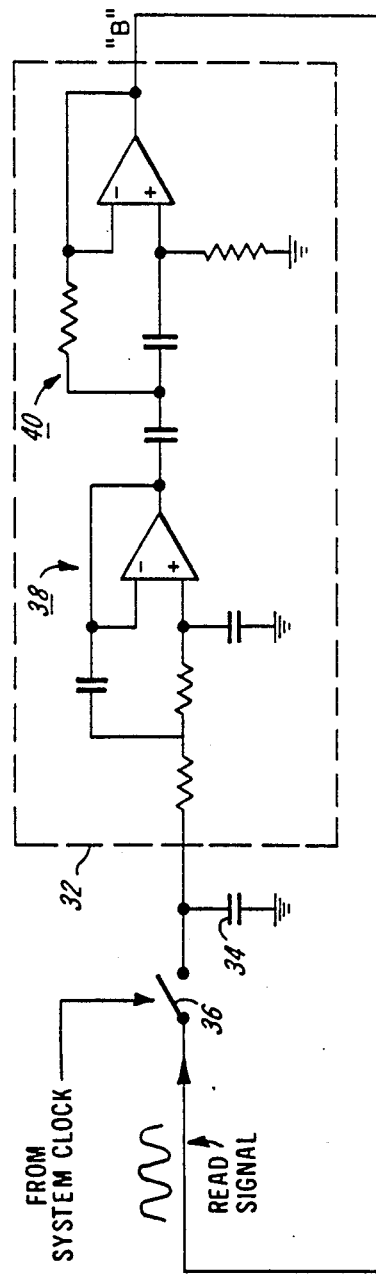
FIG. 2 illustrates schematically an improved optical reader according to the invention.
Figure 2A:
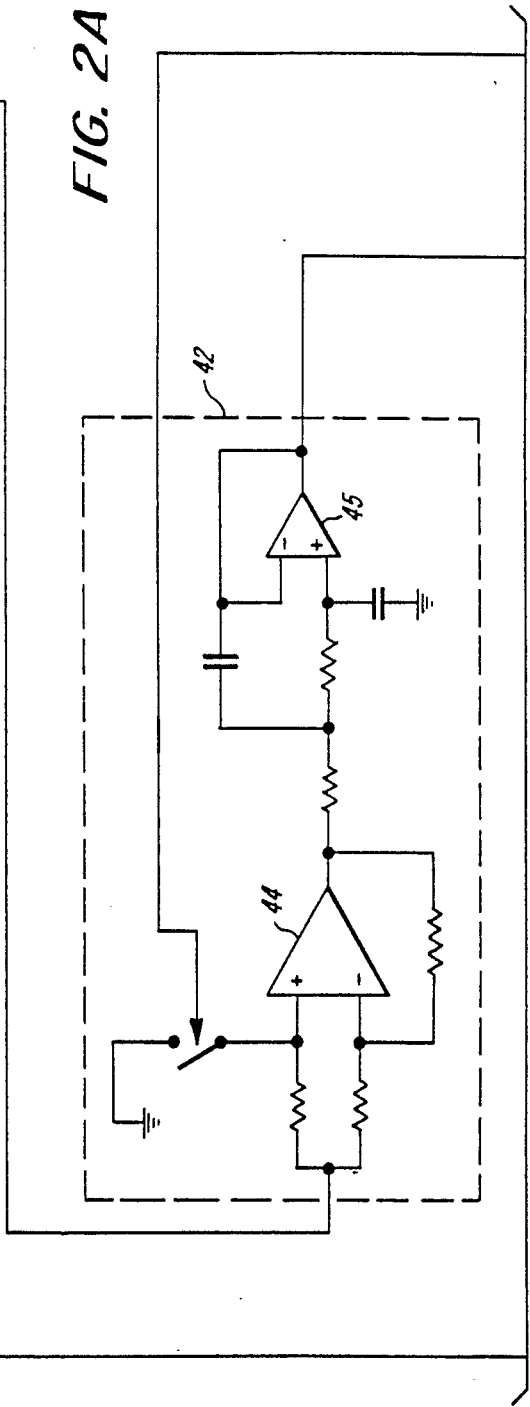
Figure 2B:
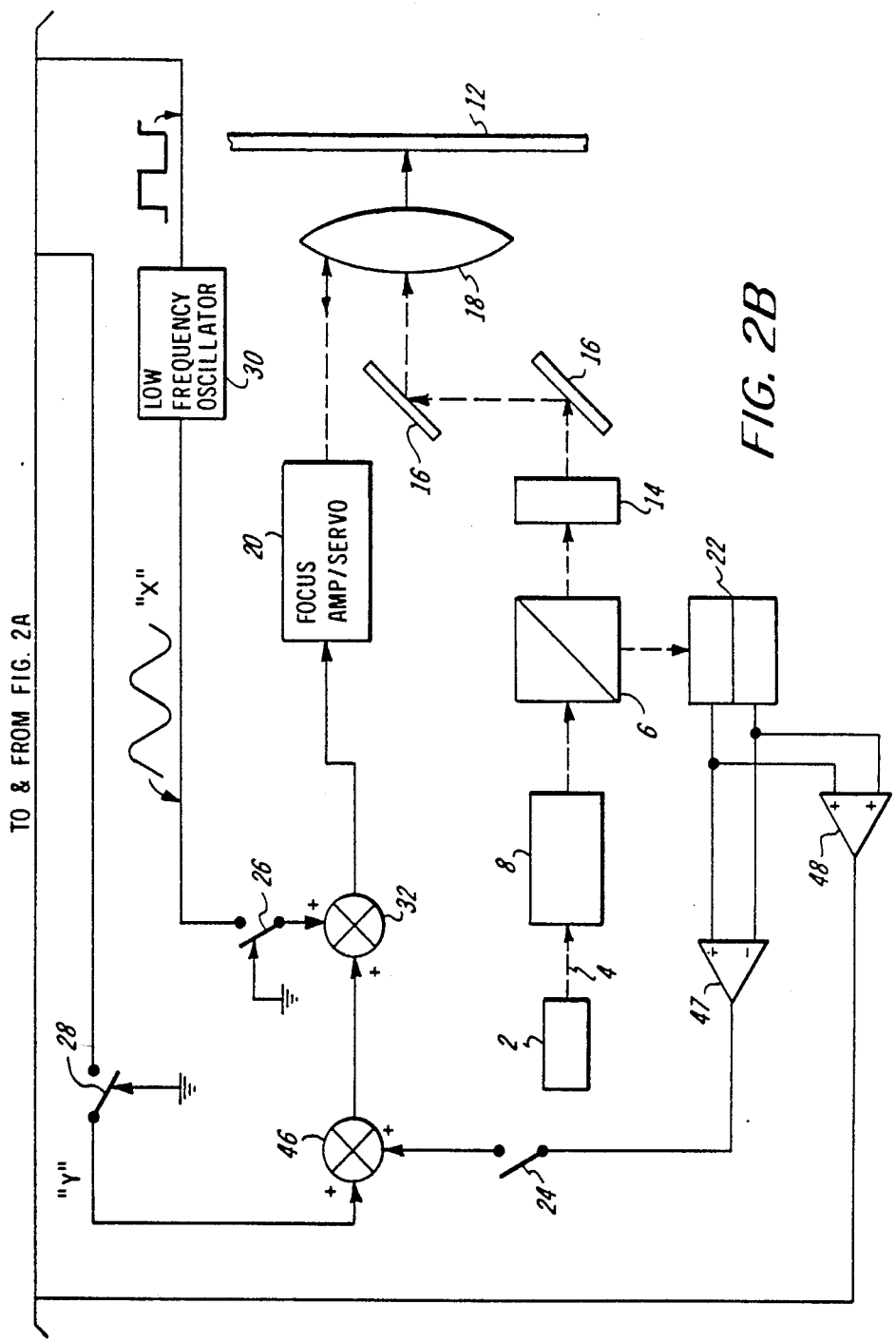

The system of FIG. 2 dynamically corrects for mechanical and electrical drift of the type previously mentioned. Referring to FIG. 2, at the time when closed loop operation of the focus servo is initiated, the switches 26 and 28 are closed allowing a low frequency, sinusoidal signal "X", such as 140 Hz or some other low frequency which is not a harmonic of the disc rotation speed, produced by a low frequency oscillator 30, to be injected into the focus error feedback loop via summing junction 32. Signal "X" causes the objective lens 18 to move very slightly back and forth or vibrate a slight amount, on the order of 0.1 micron or less. The resulting defocusing of beam 4 causes the read beam produced by the detector array to vary accordingly in amplitude in a sinusoidal manner. The read signal is fed to a very narrow band pass filter 32 by a sampling switch 36 and capacitor 34 arrangement providing a sample and hold function. Sampling by the switch 36 is at a higher frequency than signal "X" ($\geq$1.5K Hz) under control of the system clock. The detected read signal is sampled by switch 36 only at times when the beam 4 is traversing portions of the disc having information data such as pre-formatted marks.

The very narrow band pass filter 32, consisting of a low pass portion 38 and a high pass portion 40, both of conventional design, filters out the high frequency and low frequencies present in the signal supplied thereto, thereby extracting the carrier information of that signal, which information is present in the signal due to the low frequency oscillation injected into the system by waveform "X". Thus, the ouput signal of the filter 32 is an oscillatory signal "B" of low frequency. For example, when signal "X" has a frequency of 140 Hz, the bandpass of filter 32 is centered at 140 Hz.

Figure 3A:
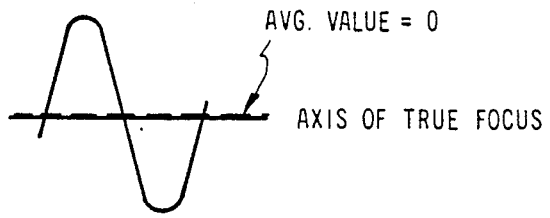
FIGS. 3a, 3b and 3c illustrate waveforms associated with the circuit operating according to the invention.
Figure 3B:
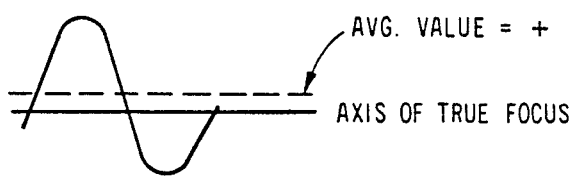
Figure 3C:
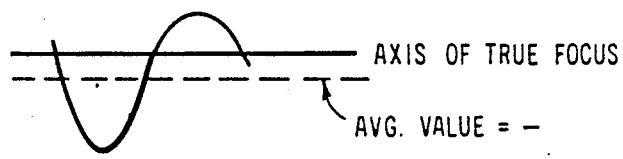

Referring to FIG. 3, the low frequency signal "B" output from the band pass filter 32 will have an oscillation about the axis of true focus of lens 18. If the lens 18 is at true focus, waveform "B" is symmetrical about the axis of true focus (FIG. 3a), thereby having an average value of zero. If the lens is offset slightly from true focus, waveform "B" will be asymmetrical about the axis of true focus (FIGS. 3b and 3c) and the average value of waveform "B" will be either plus (FIG. 3b) or minus (FIG. 3c) depending on the polarity of the offset.

Signal "B" is then processed by a synchronous detector or demodulator 42 to produce the dc correction signal "Y". Detector 42 includes an operational amplifier 44 which is controlled by a square wave signal, also produced by oscillator 30, which is of the same frequency and has the same phase as signal "X", and low pass filter 45. By having the amplifier 44 act as a phase switch, it is ensured that the information of signal "B" which is being looked at by the detector 42 is in phase with the oscillations of the objective lens 18 produced by signal "X". That phase correspondence permits the circuit to determine which way the objective lens 18 has to be moved in order to achieve true focus, that is, it ensures that the polarity of the correction signal "Y" is correct. Thus, the synchronous detector 42 detects the change in the average value of signal "B" and determines the polarity and magnitude of that change, performing that function by extracting the information from the low frequency carrier signal resulting from signal "X" by synchronizing amplifier 44 so that the detector 42 extracts both the polarity and the magnitude of the information originally imposed by signal "X".

The dc signal "Y" appearing at the output of detector 42 is proportional to the focus error and is fed back to the focus servo where it is summed into the system using a summing junction 46. The output of junction 46 is supplied as an input to summing junction 32. Signal "Y" adds to or subtracts from the focus error signal depending on the offset of lens 18 whereby the placement of lens 18 is moved accordingly so that the lens is placed at, and maintained at, true focus regardless of mechanical and electrical drifting of the components of the focus control system.

All components of the described system are of conventional design. For example, all of the operational amplifiers can be LF353 type.

We claim:

1. In an optical system including a first moveable member and a second moveable member, a closed loop arrangement for effecting movement of said first member relative to said second member in accordance with any positional error between said first and second members, said closed loop servo arrangement including first means for producing a control signal indicative of the relative positions of said first and second members, and second means for moving said first member relative to said second member in accordance with said control signal, the improvement comprising:
third means for producing a low frequency signal, fourth means for injecting said low frequency signal into said closed loop servo arrangement, fifth means coupled to said closed loop servo arrangement for producing a dc correction signal proportional to the positional error between said first and second members, and sixth means for injecting said dc correction signal into said closed loop.

2. In an optical system including a first moveable member and a second moveable member, a closed loop servo arrangement for effecting movement of said first member realtive to said second member in accordance with any positional error between said first and second members, said closed loop servo arrangement including first means for producing a control signal indicative of the relative positions of said first and second members, and second means for moving said first member relative to said second member in accordance with said control signal, the improvement comprising:
third means for producing a low frequency sinusoidal signal and a non-sinusoidal signal of the same frequency as said sinusoidal signal, fourth means for injecting said sinusoidal signal into said closed loop servo arrangement, fifth means coupled to said closed loop servo arrangement and including a synchronous detector receiving said non-sinusoidal signal for producing a dc correction signal proportional to the positonal error between said first and second members, and sixth means for injecting said dc correction signal into said closed loop.

* * * * *